(12) United States Patent
Chang et al.

(10) Patent No.: US 8,349,141 B2
(45) Date of Patent: Jan. 8, 2013

(54) METHOD FOR ONE STEP SYNTHESIZING AND IMMOBILIZING CRYSTALLINE TIO$_2$ NANO-PARTICLES SIMULTANEOUSLY ON POLYMER SUPPORT AND USE OF THE SAME

(75) Inventors: Min-Chao Chang, Hsinchu (TW); Hsin Shao, Hsinchu County (TW); Meng-Shun Huang, Taipei County (TW); Li-Ching Chung, Changhua County (TW); Po-I Liu, Kaohsiung (TW); Arnold Chang-Mou Yang, Hsinchu County (TW); Yen-Hui Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 211 days.

(21) Appl. No.: 12/661,508

(22) Filed: Mar. 17, 2010

(65) Prior Publication Data
US 2011/0089018 A1 Apr. 21, 2011

(30) Foreign Application Priority Data
Oct. 19, 2009 (TW) ............................... 98135277 A

(51) Int. Cl.
*C01G 23/047* (2006.01)
(52) U.S. Cl. ............ 204/157.43; 204/157.51; 204/157.5
(58) Field of Classification Search ............ 204/157.46, 204/157.51, 157.43, 157.5
See application file for complete search history.

(56) References Cited

U.S. PATENT DOCUMENTS

| | | | | |
|---|---|---|---|---|
| 5,242,557 | A * | 9/1993 | Jones et al. | 204/157.51 |
| 6,566,300 | B2 * | 5/2003 | Park et al. | 204/157.43 |
| 7,144,840 | B2 * | 12/2006 | Yeung et al. | 204/157.51 |
| 7,175,825 | B2 * | 2/2007 | Nakano et al. | 204/157.51 |
| 7,183,433 | B2 * | 2/2007 | Abbott et al. | 564/282 |
| 7,521,394 | B2 * | 4/2009 | Xie et al. | 502/350 |
| 7,572,974 | B2 * | 8/2009 | Chittibabu et al. | 136/263 |
| 2002/0034690 | A1 * | 3/2002 | Ono | 429/306 |
| 2006/0107997 | A1 * | 5/2006 | Matsui et al. | 136/263 |
| 2006/0219294 | A1 * | 10/2006 | Yabuuchi et al. | 136/263 |
| 2008/0234395 | A1 * | 9/2008 | Miyasaka | 516/33 |
| 2009/0004099 | A1 * | 1/2009 | Iversen et al. | 204/157.43 |
| 2009/0062109 | A1 * | 3/2009 | Boyd et al. | 502/159 |

FOREIGN PATENT DOCUMENTS

| | | |
|---|---|---|
| CN | 1559663 | 1/2005 |
| CN | 101507918 | 8/2009 |
| GR | 1005522 | 5/2007 |
| JP | 01-135842 | 5/1989 |

(Continued)

OTHER PUBLICATIONS

Stathatos et al, "A Quasi-Solid-State Dye-Sensitized Solar Cell Based on a Sol-Gel Nanocomposite Electrolyte Containing Ionic Liquid," Chem. Mater. 2003, vol. 15, pp. 1825-1829.*

(Continued)

*Primary Examiner* — Keith Hendricks
*Assistant Examiner* — Colleen M Raphael
(74) *Attorney, Agent, or Firm* — J.C. Patents

(57) ABSTRACT

A method for one step synthesizing and immobilzing crystalline titanium dioxide (TiO$_2$) nano-particles simultaneously on a polymer support and a use thereof are provided. The method includes adding TiO$_2$ precursor, water, alcohol and an ionic liquid in a sol-gel reaction under microwave irradiation, so that a plurality of TiO$_2$ crystalline nano-particles are synthesized and immobilized on the polymer support simultaneously.

20 Claims, 8 Drawing Sheets

FOREIGN PATENT DOCUMENTS

WO 2008054337 5/2008

OTHER PUBLICATIONS

Lopes, "Preparation of HNAY zeolite by ion exchange under microwave treatment. A preliminary study," Catalysis Letters vol. 53, No. 1-2, pp. 103-106 (1998).*

Partial translation of CN 101507918.*

Authored by Zhou, et al., article titled "Synthesis of very small TiO2 nanocrystals in a room-temperature Ionic liquid and their self-assembly toward mesoporous spherical aggregates," adopted from Journal of American Chemical Society, 2003, 125, pp. 14960-14961.

Authored by Carlson, et al., article titled "Solvent deposition of Titanium dioxide on acrylic for photocatalytic application ," adopted from Ind. Eng. Chem. Res., 2007, 46, pp. 7970-7976.

Authored by Zhiyong, et al., article titled "Preparation, stabilization and characterization of TiO2 on thin polyethylene films (LDPE). Photocatalytic applications ," adopted from Water research, 2007, 41, pp. 862-874.

Authored by Huang, et al., article titled "Effect of PET Melt Spinning on TiO2 Nanoparticle Aggregation and Friction Behavior of Fiber Surface ," Ind. Eng. Chem. Res., 2007, 46, pp. 5548-5554.

"Office Action of Taiwan Counterpart Application", issued on Oct. 22, 2012, p1-p6, in which the listed reference was cited.

* cited by examiner

METHOD FOR ONE STEP SYNTHESIZING AND IMMOBILIZING CRYSTALLINE TIO₂ NANO-PARTICLES SIMULTANEOUSLY ON POLYMER SUPPORT AND USE OF THE SAME

CROSS-REFERENCE TO RELATED APPLICATION

This application claims the priority benefit of Taiwan application serial no. 98135277, filed on Oct. 19, 2009. The entirety of the above-mentioned patent application is hereby incorporated by reference herein and made a part of specification.

BACKGROUND OF THE INVENTION

1. Field of the Invention

The invention relates to a method of one step synthesizing and immobilizing crystalline titanium dioxide ($TiO_2$) nano-particles simultaneously on a polymer support and a use of the same.

2. Description of Related Art

Crystalline titanium dioxide nano-particle is frequent used as a photocatalyst due to its superior oxidation-reduction ability and high chemical stability. Crystalline titanium dioxide nano-particle can be synthesized by various methods and one of methods is sol gel method. The usage of ionic liquid (IL) in sol gel method for synthesizing crystalline titanium dioxide nano-particle under ambient condition was first published in J. AM. CHEM. SOC. 2003, 125, 14960-14961, 2003. Owing to the self-organizing ability of ion liquid, anatase crystalline $TiO_2$ nano-particle, which has large surface area, can be obtained by this method ("$TiO_2$ particles" and "crystalline $TiO_2$ nano-particles" both refer to the anatase crystalline $TiO_2$ nano-particles thereinafter). Combining with the high microwave (MW) absorbing ability of ionic liquid, IL/MW method is recognized as a green synthetic method for synthesizing inorganic nano-material. The two principal benefits of this method are high reaction rate and short reaction time.

In photocatalytic water treatment application, crystalline $TiO_2$ nano-particles, mainly anatase type, are directly dispersed in an aqueous phase or immobilized on different supports such as ceramic tile, glass, polymer material, stainless steel plate, aluminum sheets, and so on. In conventional immobilization process, because of high calcination temperature requirement of forming crystalline $TiO_2$ nano-particles, above 400° C., high temperature-resistant materials, such as glass, steel, and the like, are generally used. However this is a costly process and thus the commercial application has met its bottleneck. Hence, the usage of low cost polymer material as the immobilization support is currently an active research topic in recent year.

Polymer material is thermal sensitive material. The immobilization of crystalline $TiO_2$ nano-particles on the polymer material is generally by two step process. For example, $TiO_2$ sol is firstly synthesized and then coated on the polymer materials by dip coating method. Alternatively, an embedding process can also be applied, where crystalline $TiO_2$ nano-particles are embedded into melted polymer materials such as polyethylene by hot press at suitable condition. However, the crystalline $TiO_2$ nano-particles are easily aggregated and difficult to be homogeneously dispersed in these methods and then the immobilization adhesion strength is poor and the crystalline $TiO_2$ nano-particles peel off easily.

SUMMARY OF THE INVENTION

The disclosure is directed to a method for one step synthesizing and immobilizing crystalline titanium dioxide ($TiO_2$) nano-particles simultaneously on a polymer support and a use of the same. The crystalline $TiO_2$ nano-particles are immobilized on the polymer support using this method. The crystalline $TiO_2$ nano-particles have superior adhesion on the surface of the polymer support. The technique of this invention is not limited to the photocatalytic application. Other industrial applications can also be included, if crystalline $TiO_2$ nano-particles are needed to be immobilized on the polymer support.

The disclosure provides a method for one step synthesizing and immobilizing crystalline $TiO_2$ nano-particles simultaneously on the polymer support. In this method, a polymer support is provided, and then a sol-gel reaction is occurred on the surface of polymer support under microwave irradiation. Accordingly the crystalline $TiO_2$ nano-particles are synthesized and immobilized on the surface of polymer support. In the sol-gel reaction, a $TiO_2$ precursor, water, alcohol, and ionic liquid are used.

The disclosure further provides a use of the method of one step synthesizing and immobilizing crystalline $TiO_2$ nano-particles simultaneously on the polymer support as mentioned above. This invention is adopted in a fabrication of a $TiO_2$ product using polymer material as a support.

In light of the foregoing, in the disclosure, the ionic liquid is used in the sol-gel process under the microwave irradiation with one step process. Then the crystalline $TiO_2$ nano-particles are produced in-situ and directly immobilized on the surface of polymer support. Moreover, the immobilization adhesion strength of the crystalline $TiO_2$ nano-particles on the surface of the polymer substrate by this disclosure is high.

Therefore, the disclosure is superior to the conventional two step method. In the latter method, the $TiO_2$ crystalline nano-particle is first synthesized and then immobilized on the polymer support by other physical or chemical method.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
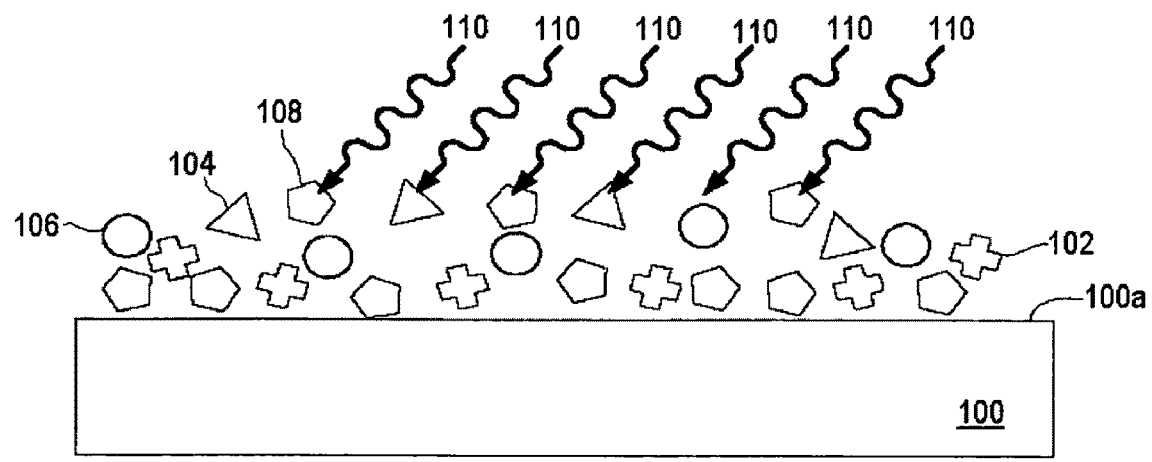
FIG. 1 is a schematic diagram a method of one step synthesizing and immobilizing crystalline $TiO_2$ nano-particles simultaneously on the polymer support according to an embodiment of the disclosure.

The following embodiments and the attached figures are merely used to describe the applications of the disclosure in detail. Nevertheless, the disclosure may also be embodied in different forms and should not be limited to the embodiments set forth hereinafter. For clarity, the sizes and relative sizes of each of the elements in the drawings may be illustrated in exaggerated proportions.

FIG. 1 is a schematic diagram of one step synthesizing and immobilizing crystalline TiO$_2$ nano-particles simultaneously on the polymer support according to an embodiment of the disclosure. In the present embodiment, a material of the polymer support 100, for example, is a thermoplastic polymer material such as polymethyl methacrylate (PMMA), polycarbonate (PC), polyester, polyamide, and the like. In addition, although the polymer substrate 100 has a shape of a plate, the disclosure is not limited thereto. Any support made of polymer materials can utilize the method of the disclosure to immobilize the crystalline TiO$_2$ nano-particles on the surface thereof in one step regardless of its shape (i.e., a shape of a slab, a plate, a sheet, or a fiber).

In FIG. 1, a sol-gel reaction is occurred to form the crystalline TiO$_2$ nano-particles on the surface of the polymer support 100. The ingredients used in the sol-gel reaction, include TiO$_2$ precursor 102, water 104, an alcohol 106, and an ionic liquid 108 under a microwave irradiation 110. The ionic liquid 108 is, for instance, a conventional ionic liquid (IL) or a deep eutectic mixture solvent type ionic liquid. In this embodiment, the frequency of the microwave irradiation is ranged from 0.3 GHz to 300 GHz, and the reaction site temperature under the microwave irradiation is ranged from 40° C. to 200° C., for example.

In one embodiment, the ionic liquid 108 is the conventional ionic liquid, for example. Moreover, a cation thereof includes, for example, 1-alkyl-3-methylimidazolium, [C$_n$MIM]$^+$, where n represents a number of linear alkyl carbons, N-alkylpyridinium, [C$_n$PY]$^+$, where n represents a number of linear alkyl carbons, tetraalkylammonium, or tetraalkylphosphonium. Additionally, an anion thereof includes, for example, hexafluorophosphate (PF$_6^-$), tetrafluoroborate (BF$_4^-$), trifluoromethylsulfonate (CF$_3$SO$_3^-$), (bis[(trifluoromethyl)sulfonyl]amide, [(CF$_3$SO$_2$)$_2$N]$^-$, trifluoroethanoate (CF$_3$CO$_2^-$), ethanoate (CH$_3$CO$_2^-$), or a halide such as Br$^-$, Cl$^-$, or I$^-$. The anion combines with different organic or inorganic cations to form an ionic liquid with a large molecular weight.

In another embodiment, the ionic liquid 108 is the deep eutectic mixture solvent type ionic liquid such as an eutectic mixture having a low melting point and formed by quaternary ammonium salt and hydrogen donors. For example, the eutectic mixture having the low melting point is formed by mixing an oxalic acid and a choline cholide.

The TiO$_2$ precursor 102 used in the sol-gel process is, for instance, titanium alkoxide, or a titanium compound capable of undergoing hydrolysis and condensation reaction with water. For example, the titanium alkoxide is titanium ethoxide (Ti(OC$_2$H$_5$)$_4$) or titanium isopropoxide (Ti(OCH(CH$_3$)$_2$)$_4$). The alcohol 106 used in the sol-gel process includes an alcohol having a carbon number of 1-10; a primary alcohol (1°), a secondary alcohol (2°), or a tertiary alcohol (3°), such as ethanol, isopropyl alcohol, or tert-butyl alcohol; or diols or triols, such as ethylene glycol or glycerol. A molar ratio of the compounds used in the sol-gel process is, for example: TiO$_2$ precursor:water:alcohol:ionic liquid=0.5-20:0.5-200:0.5-100:0.5-200:0.5-100:0.5-200.

Figure 2:
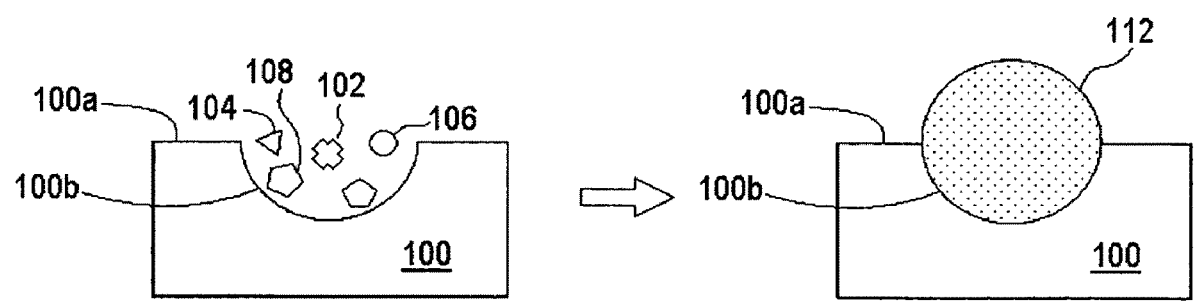
FIG. 2 is a magnified view of a partial area in FIG. 1.

FIG. 2 is a magnified view of a partial area of FIG. 1. As shown in FIG. 2, when components, such as the compounds applied in the sol-gel reaction under microwave irradiation, contact the polymer substrate 100, a surface 100a thereof becomes rough, and then crystalline TiO$_2$ nano-particles 112 are immobilized directly on a plurality of cavities 100b. At this time, a superior surface adhesion is found between the crystalline TiO$_2$ nano-particles 112 and the polymer support 100. The superior adhesion strength still retains after 30 minutes of ultra-sonic treatment.

In the method of the aforementioned embodiment, the microwave irradiation is adopted. Since conventional polymer materials do not absorb microwave, the entire system is only microwave heated at reaction sites containing polar materials such as water, ionic liquid or alcohol. Therefore, the surrounding temperature of the reaction system can be controlled under 150° C., accordingly, the crystalline anatase TiO$_2$ nano-particles are synthesized and immobilized on the surface of the polymer support by one step without affecting the physical and mechanical properties of the polymer material. Hence, the method in the embodiment mentioned above is suitable to be applied in immobilization of crystalline anatase TiO$_2$ nano-particle (i.e. photocatalyst products) using the polymer materials as the support. The foregoing polymer materials are the materials of the polymer support 100 in the embodiment aforementioned. As long as the support itself is made of a polymer material, the crystalline anatase TiO$_2$ nano-particles can be synthesized on the surface of the support using the methods aforementioned regardless of the shape being a slab, a plate, a sheet, or a fiber. For instance, when the support is a fiber type, the crystalline anatase TiO$_2$ nano-particles can be directly synthesized and immobilized thereon with the method of the disclosure by one step. Obviously, this method can be applied to non-woven fabrics and the like.

The following exemplifies a plurality of experiments to demonstrate efficacy of the disclosure.

EXPERIMENT 1

Figure 3:
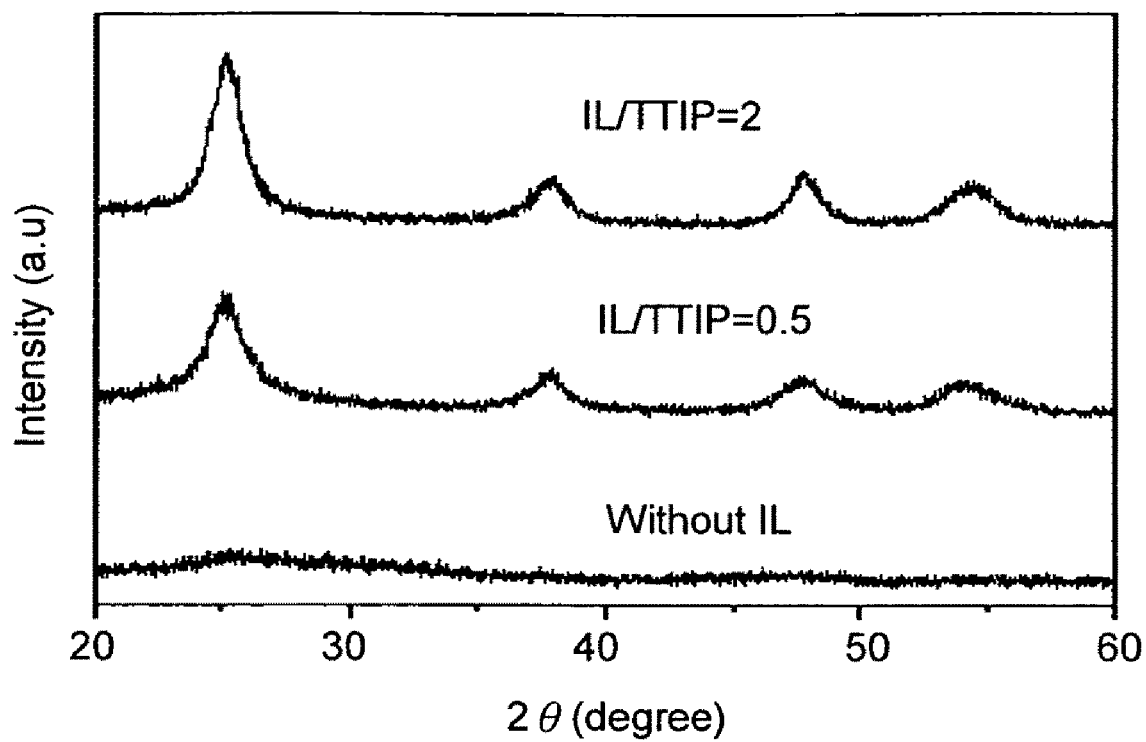
FIG. 3 is an X-ray diffraction (XRD) diagram of Experiment 1 in the disclosure.

In this experiment, the ingredients include the following: titanium tetraisopropoxide, (TTIP, manufactured by E. Merck) as the TiO$_2$ precursor, isopropyl alcohol (IPA, manufactured by E. Merck) as the alcohol, deionized water, and 1-butyl-3-methylimidazolium tetrafluoroborate, [Bmim]$^+$[BF$_4$]$^-$, (manufactured by E. Merck), as the ionic liquid (IL). With a molar ratio of the ingredients being TTIP:IPA:H$_2$O=1:3:5, the amount of the IL added is changed, where the molar ratio of IL/TTIP is 0, 0.5, and 2 respectively. The deionized water is then added to the reaction mixture. Afterwards, the mixture is further stirred for 10 minutes at room temperature and then microwave irradiated for 20 minutes, where the microwave power is 800W and the frequency thereof is 2.45 GHz. The dried product of TiO$_2$ after filtration is examined with X-ray diffraction (XRD) and FIG. 3 is obtained therefrom. As shown in FIG. 3, the crystalline anatase $TiO_2$ nanoparticles are formed and the anatase crystallinity increased with the increasing of IL.

EXPERIMENT 2

Figure 4A:
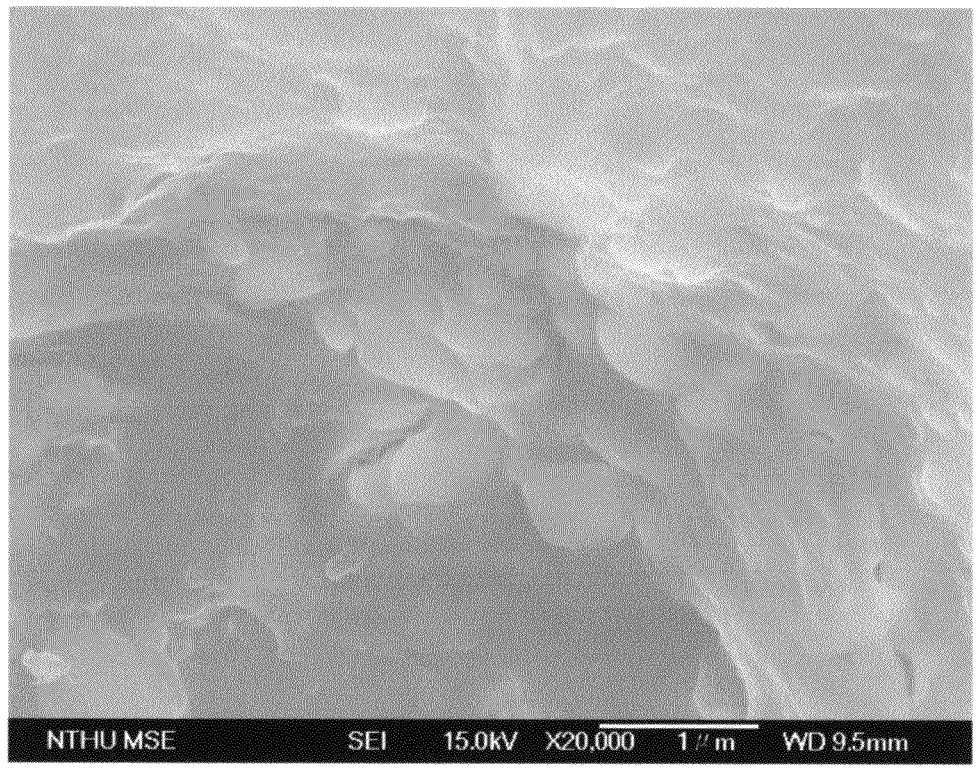
FIG. 4A is a scanning electron microscope (SEM) photograph of PMMA in the presence of IPA under microwave irradiation.
Figure 4B:
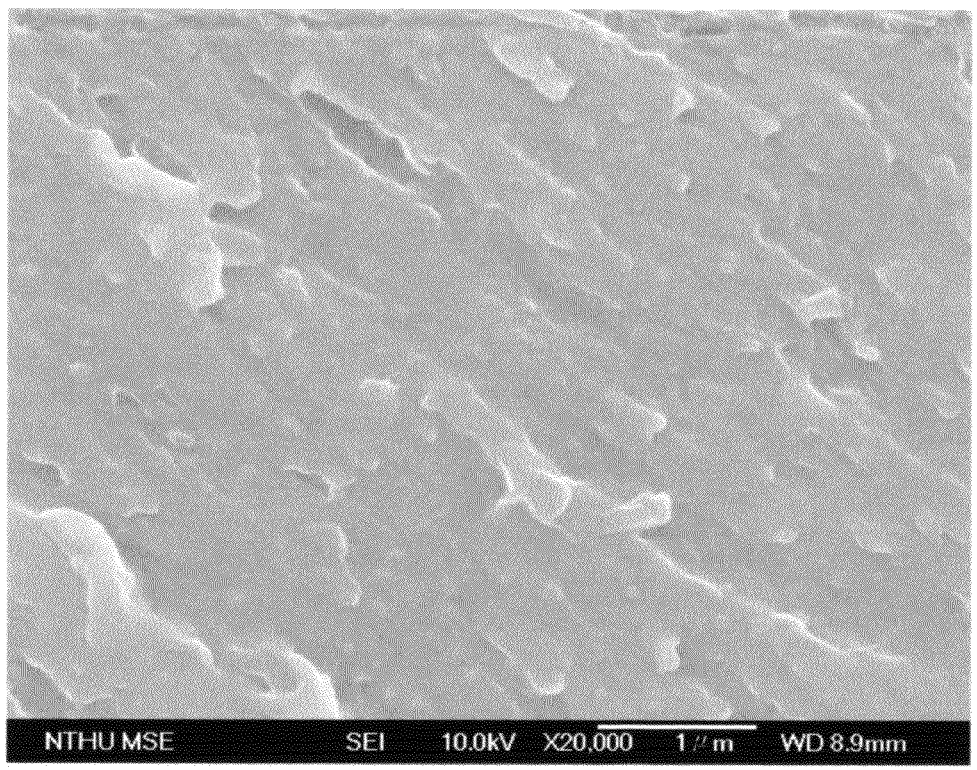
FIG. 4B is a SEM photograph of PMMA in the presence of IL under microwave irradiation.

FIG. 4A is a scanning electron microscope (SEM) photograph of PMMA sheet treated with IPA for 3 minutes under microwave irradiation. An SEM photograph of FIG. 4B is the PMMA sheet treated with IL (IL is $[Bmim]^+[BF_4]^-$) for 30 minutes under microwave irradiation. As illustrated in FIG. 4A and FIG. 4B, IPA and IL both roughens the surface of PMMA.

EXPERIMENT 3

In this experiment, the PMMA sheet (i.e. with a size of, for example, 20 mm×10 mm×2 mm) or the sheet-shaped PMMA support (i.e. a cylinder with a diameter of 4 mm and a height of 3 mm) is first placed within a reaction vessel. The IL is $[Bmim]^+[BF_4]^-$, where the molar ratio of TIPP:IPA:IL: $H_2O$=1:3:1:3:1:100. The deionized water is added to the reaction mixture of TTIP, IPA, and IL at a rate of 20 mL/min and then the mixture is microwave irradiated directly for 30 minutes.

Figure 5:
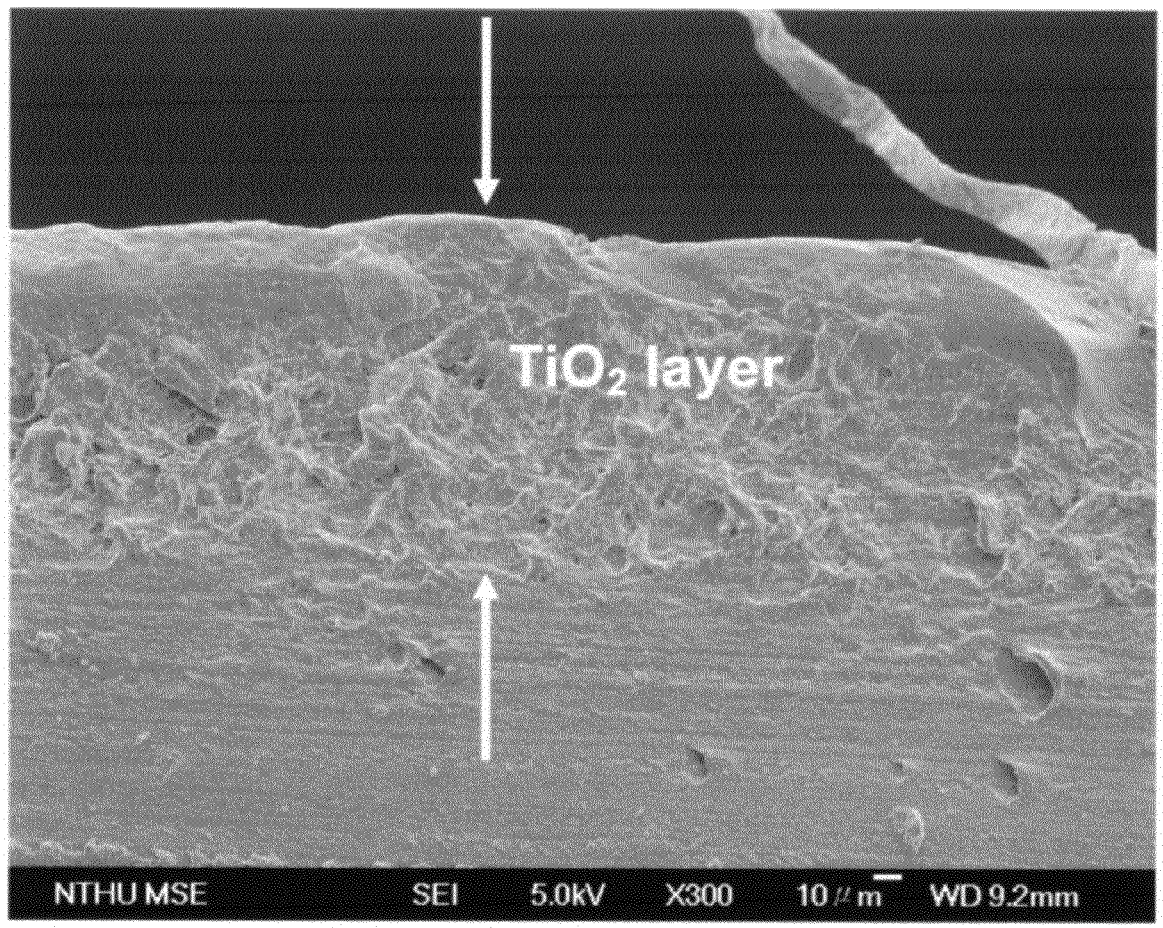
FIG. 5 is a SEM photograph of a cross-section of the PMMA support with the immobilized titanium dioxide (TiO$_2$) obtained from Experiment 3.

The final PMMA sheet is shown in FIG. 5, which illustrates a SEM photograph of a cross-section of crystalline $TiO_2$ immobilized on the surface of the PMMA support obtained from Experiment 3.

EXPERIMENT 4

In this experiment, the PMMA sheet (i.e. 20 mm×10 mm×2 mm) is first placed within a reaction vessel. Further, the ingredients in Experiment 1 are used to perform under microwave irradiation by adjusting different ratios of ingredient The photocatalytic efficiency of the immobilized $TiO_2$ is examined.

Figure 6:
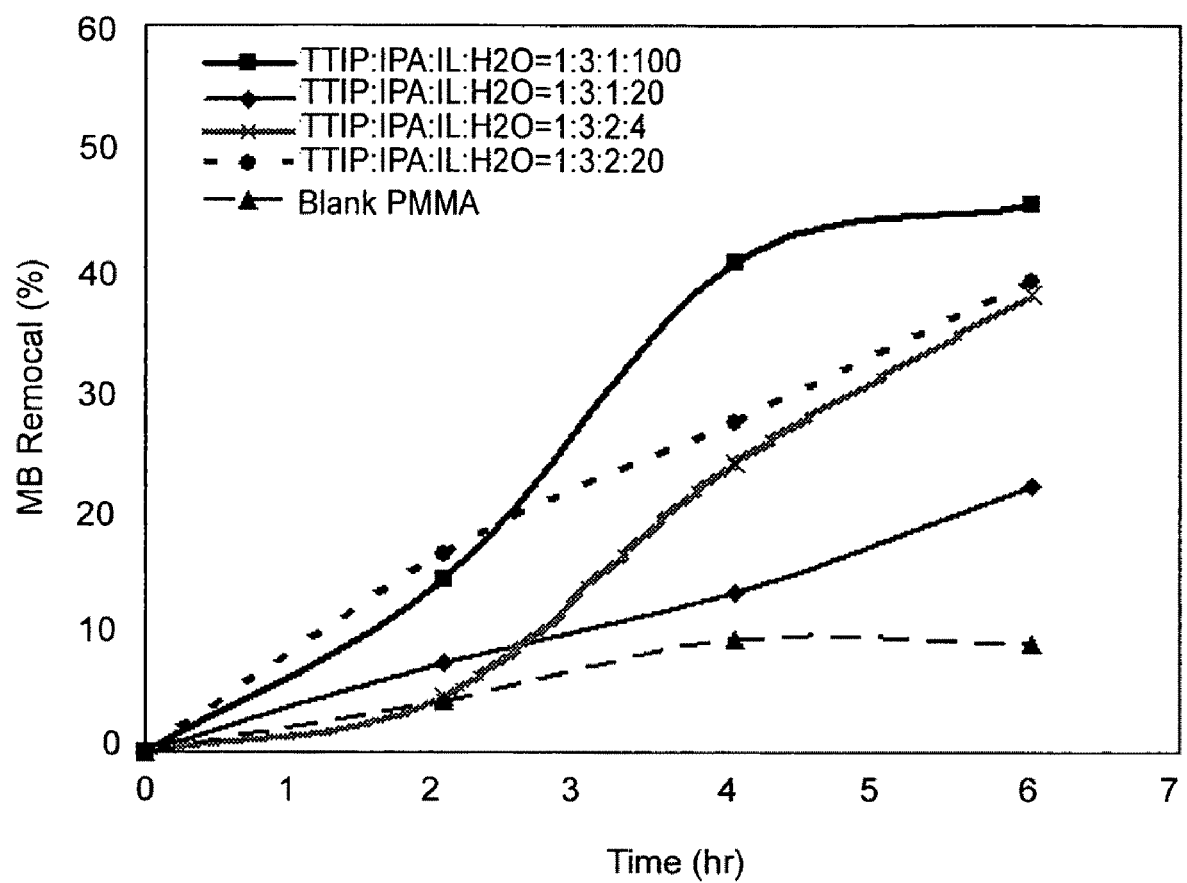
FIG. 6 illustrates the figure of photocatalytic efficiencies of the crystalline TiO$_2$ nano-particles synthesized by this disclosure under different ratios of reagents.

In the photocatalytic efficiency test, 300 ml of aqueous solution with 5 ppm methylene blue (MB) is first prepared. Several immobilized $TiO_2$ samples are added. Thereafter, the UV light is applied, the wavelength of UV is 365 nm and light intensity is 13 W. The irradiation time is 6 hours. A sample for analysis is aliquot every 2 hours and the results are shown in FIG. 6. From the results of FIG. 6, it can be seen that the immobilized $TiO_2$ sample prepared with the method of the disclosure does have significant photocatalytic performance.

EXPERIMENT 5

In this experiment, the slab type chip PMMA (a cylinder with a diameter of 4 mm and a height of 3 mm), the same method as that performed in Experiment 4 is carried out.

The photocatalytic efficiency experiment includes the following. Here, 300 ml of aqueous solution with 5 ppm methylene blue (MB) is first prepared. Several PMMA samples have been placed therein, raw water. The light source is the same as that of Experiment 4. The irradiation time is 6 hours. A sample for analysis is aliquot every 2 hours and the results are shown in FIG. 7.

Figure 7:
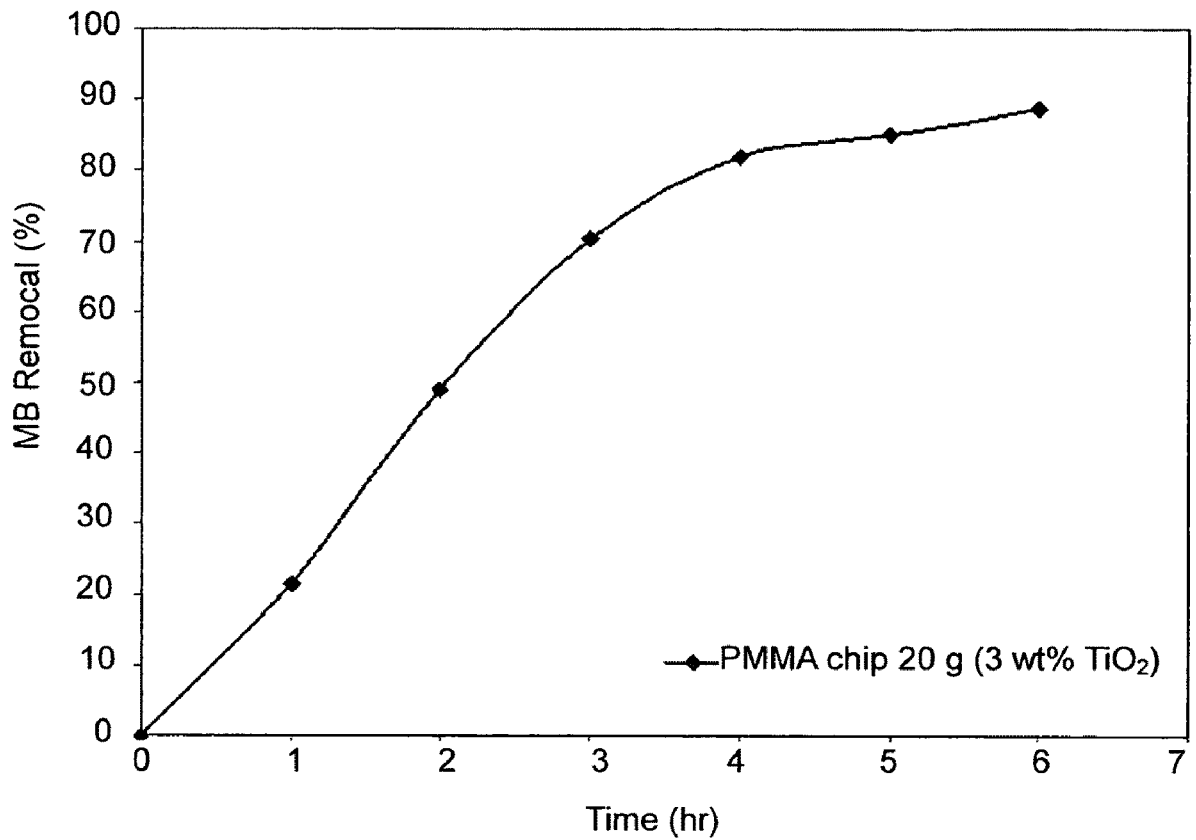
FIG. 7 is the figure of photocatalytic efficiencies of immobilized TiO$_2$ using the slab type PMMA.

From the results of FIG. 7, it can be seen that immobilized $TiO_2$ sample prepares in this experiment does have significant photocatalytic performance.

EXPERIMENT 6

In this experiment, the sheet-shaped supports of PE-PVAc, and PVAE are respectively placed in the reaction vessel. The reagents with a molar ratio of TIPP:IPA:IL:$H_2O$=1:3:1:100. IPA:IL:$H_2O$=1:3:1:100. With the same photocatalytic performance test method in Experiment 3, the photocatalyst efficiency of crystalline $TiO_2$ immobilized on different polymer support is examined, and the results are shown in FIG. 8.

Figure 8:
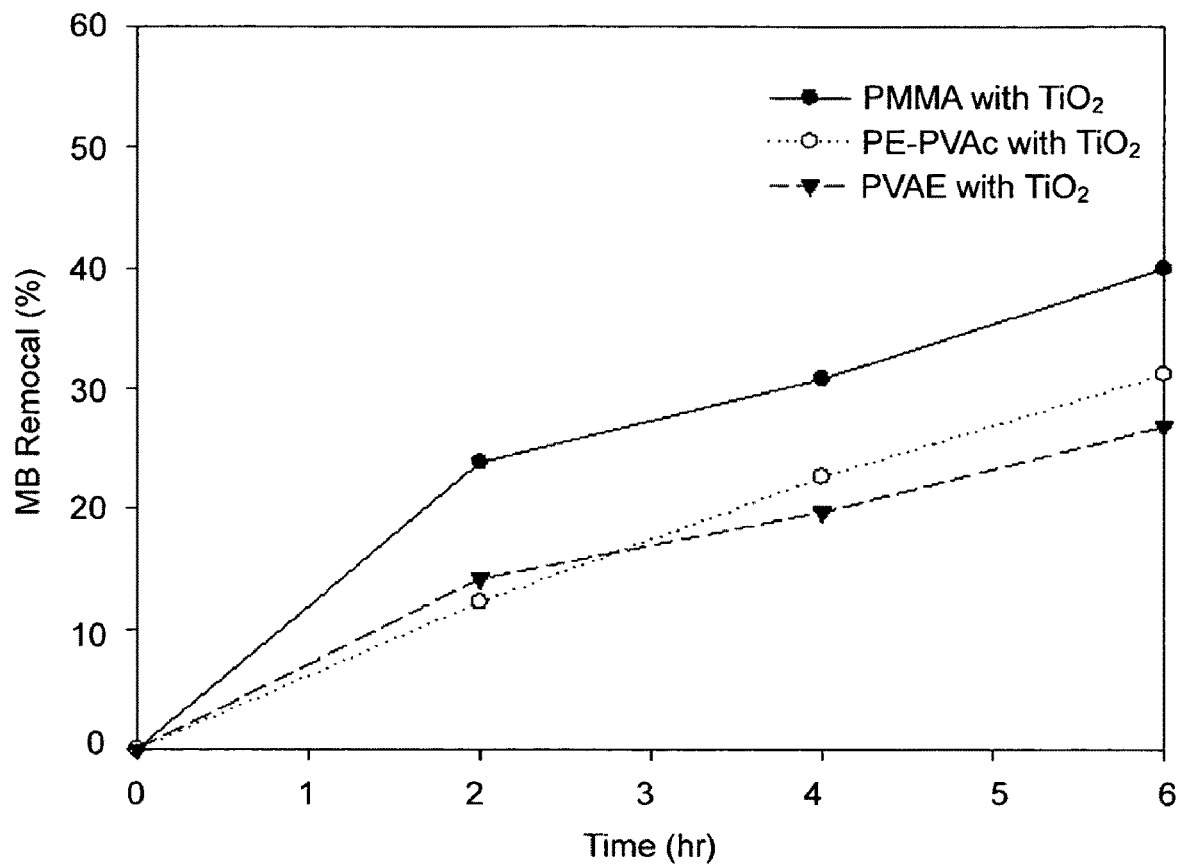
FIG. 8 is the figure of photocatalytic efficiencies of TiO$_2$ immobilized on different polymer supports.

As the results are illustrated in FIG. 8, it can be seen that crystalline $TiO_2$ nanoparticle synthesized with the method of the disclosure can be immobilized on the surface of PMMA, PE-PVAc, or PVAE. The immobilized $TiO_2$ retains the photocatalytic effect.

EXPERIMENT 7

Figure 9:
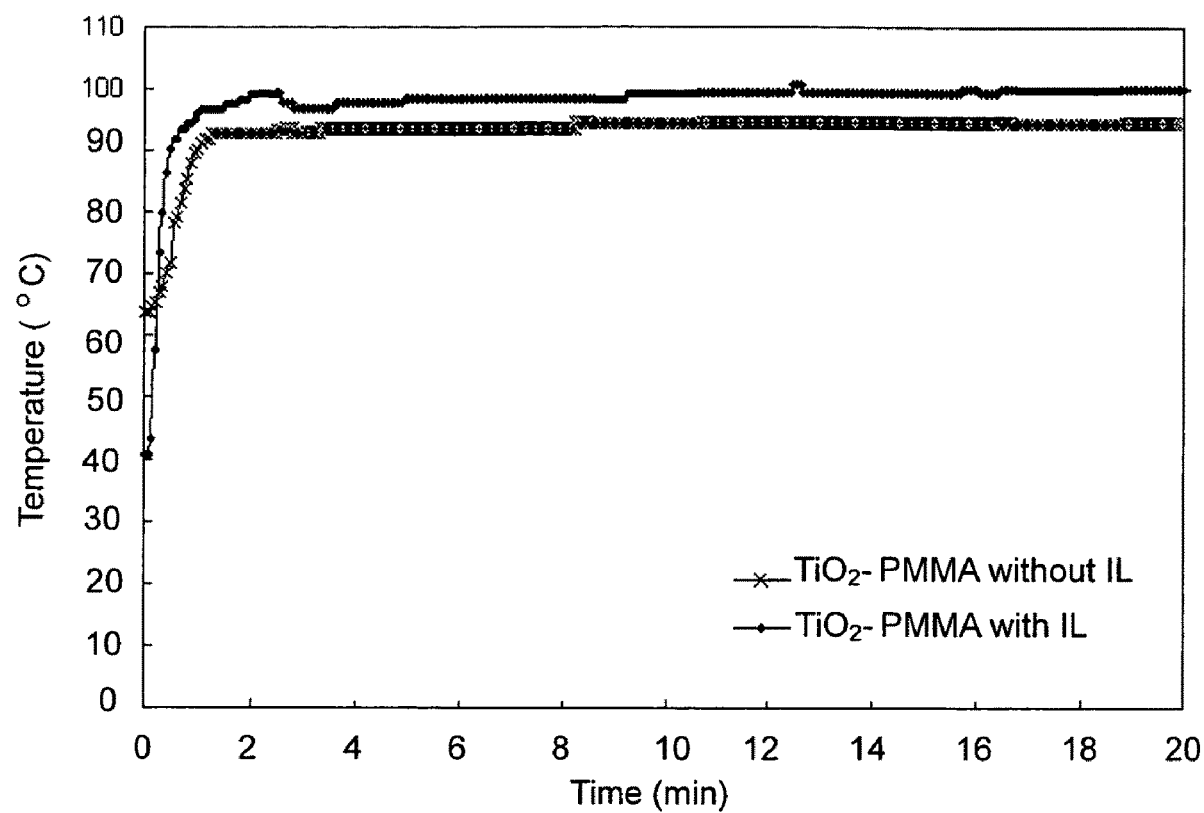
FIG. 9 is the temperature profiles of the reaction in Experiment 3 of the disclosure.

All the steps performed in Experiment 7 are identical to those implemented in Experiment 3 besides the addition of IL. The temperature profiles reveal that the temperature of the reaction system is under 100° C., as shown in FIG. 9. However, the reaction temperature slightly increases when IL is added.

In summarizing the illustrations and experiments above-mentioned, in the disclosure, the ionic liquid and microwave irradiation are used simultaneously in this one step method. Therefore, the crystalline anatase $TiO_2$ nano-particles are in-situ synthesized and immobilized on the surface of the polymer support. The disclosure achieves the synthesis and immobilization simultaneously by one step process, thus is much more time saving and energy saving than the conventional two steps immobilization method. In addition, the IL can be recycled, so the disclosure is a green technology.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A method of one step synthesizing and immobilizing crystalline titanium dioxide ($TiO_2$) nano-particles simultaneously on a polymer support, comprising:
   providing a polymer support;
   and synthesizing a plurality of crystalline TiO2 nano-particles simultaneously with immobilizing the crystalline TiO2 nano-particles on a surface of the polymer support by causing a sol-gel reaction on the surface of the polymer support under a microwave irradiation, wherein a TiO2 precursor, water, an alcohol, and an ionic liquid are applied in the sol-gel reaction during the synthesizing.

2. The method as claimed in claim 1, wherein the ionic liquid comprises a conventional ionic liquid or a deep eutectic mixture solvent type ionic liquid.

3. The method as claimed in claim 2, wherein a cation of the conventional ionic liquid comprises 1-alkyl-3-methylimidazolium, $[C_nMIM]^+$, wherein n represents a number of linear alkyl carbons, N-alkylpyridinium, $[C_nPY]^+$, wherein n represents a number of linear alkyl carbons, tetraalkylammonium, or tetraalkylphosphonium.

4. The method as claimed in claim 2, wherein an anion of the conventional ionic liquid comprises hexafluorophosphate, tetrafluoroborate, trifluoromethylsulfonate, (bis[(trifluoromethyl)sulfonyl]amide, trifluoroethanoate, ethanoate, or a halide.

5. The method as claimed in claim 4, wherein the halide comprises $Br^-$, $Cl^-$, or $I^-$.

6. The method as claimed in claim 2, wherein the deep eutectic mixture solvent type ionic liquid comprises an eutectic mixture having a low melting point being formed by quaternary ammonium salt and hydrogen donors.

7. The method as claimed in claim 6, wherein the deep eutectic mixture solvent type ionic liquid having the low melting point is formed by an oxalic acid and a choline cholide.

8. The method as claimed in claim 1, wherein the $TiO_2$ precursor comprises titanium alkoxide or a titanium compound capable of undergoing hydrolysis and condensation reaction with water.

9. The method as claimed in claim 8, wherein the titanium alkoxide comprises titanium ethoxide or titanium isopropoxide.

10. The method as claimed in claim 1, wherein the alcohol comprises an alcohol having a carbon number of 1-10.

11. The method as claimed in claim 1, wherein the alcohol comprises a primary alcohol, a secondary alcohol, or a tertiary alcohol.

12. The method as claimed in claim 11, wherein the alcohol comprises ethanol, isopropyl alcohol, or tert-butyl alcohol.

13. The method as claimed in claim 1, wherein the alcohol comprises diols or triols.

14. The method as claimed in claim 13, wherein the alcohol comprises ethylene glycol or glycerol.

15. The method as claimed in claim 1, wherein a molar ratio of compounds used in the reaction is: $TiO_2$:water:alcohol:ionic liquid =0.5-20:0.5-200:0.5-100:0.5-200:0.5-100:0.5-200.

16. The method as claimed in claim 1, wherein the frequency of the microwave irradiation ranges from 0.3 GHz to 300 GHz.

17. The method as claimed in claim 1, wherein the reaction temperature under the microwave irradiation ranges from 40° C. to 200° C.

18. The method as claimed in claim 1, wherein a material of the polymer support comprises a thermoplastic polymer material.

19. The method as claimed in claim 18, wherein the material of the polymer support comprises polymethyl methacrylate, polycarbonate, polyester, or polyamide.

20. The method as claimed in claim 1, wherein a type of the polymer support comprises a shape of a slab, a plate, a sheet, or a fiber.

* * * * *